United States Patent
Hoge

[15] 3,681,620
[45] Aug. 1, 1972

[54] VARIABLE FREQUENCY CONTROL CIRCUIT

[72] Inventor: Henri H. Hoge, Baltimore, Md.

[73] Assignee: Rhomega System, Incorporated

[22] Filed: April 17, 1970

[21] Appl. No.: 29,494

[52] U.S. Cl. .................307/271, 307/265, 318/341
[51] Int. Cl. .............................................H03k 1/10
[58] Field of Search ......307/265, 271; 318/138, 341, 318/345; 317/137

[56] References Cited

UNITED STATES PATENTS

| | | | |
|---|---|---|---|
| 3,358,206 | 12/1967 | Thiele | 318/341 |
| 3,260,853 | 7/1966 | Kihara | 307/271 |
| 3,446,992 | 5/1969 | Webb | 307/271 |
| 2,914,693 | 8/1955 | Van Eyk | 317/137 |
| 3,191,113 | 6/1965 | Gargani | 318/341 |
| 3,214,666 | 10/1965 | Clerc | 318/341 |
| 3,223,912 | 12/1965 | Sheheen | 318/341 |
| 3,378,745 | 4/1968 | James | 318/341 |

Primary Examiner—Donald D. Forrer
Assistant Examiner—R. E. Hart
Attorney—Colton & Stone

[57] ABSTRACT

A variable frequency pulse generator is employed to control the frequency of a monostable multivibrator which provides drive pulses of a constant pulse width to a D.C. load. Discharge circuits are provided to discharge a capacitor in the pulse generator during the operation of the multivibrator and to drive down the charge in a multivibrator capacitor at the end of each drive pulse to provide substantially instantaneous recycling.

9 Claims, 1 Drawing Figure

PATENTED AUG 1 1972
3,681,620
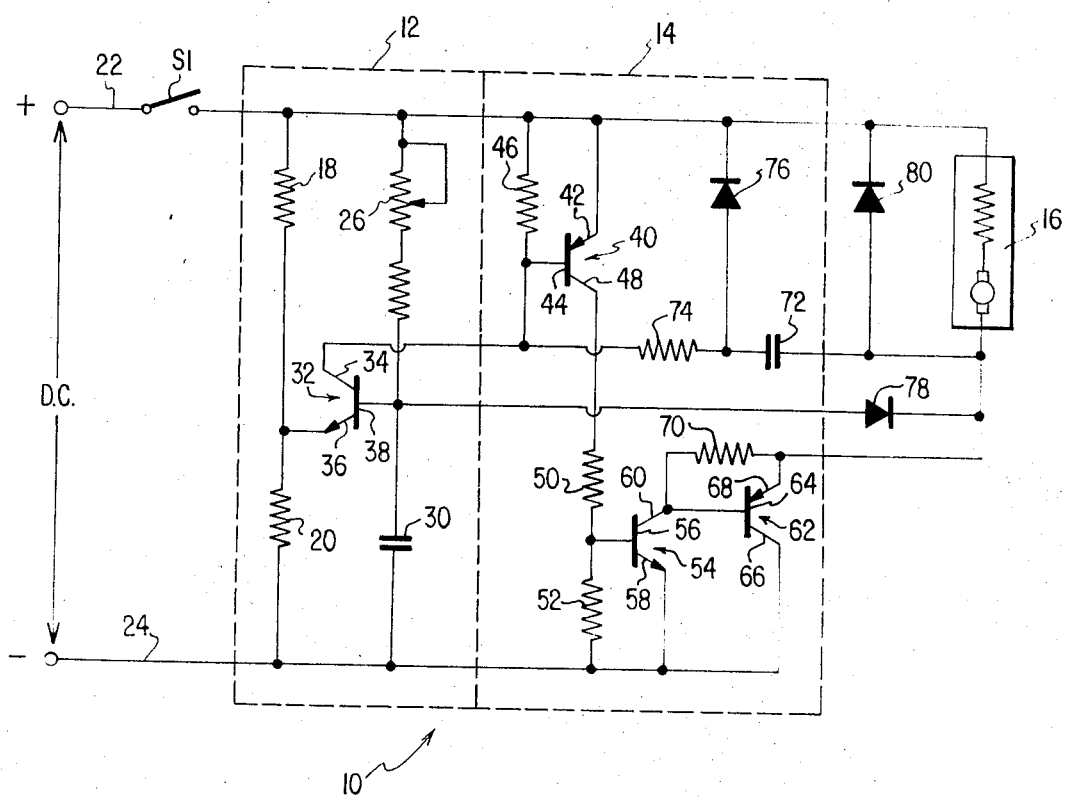
INVENTOR
HENRI H. HOGE
BY *Colton & Stone*
ATTORNEYS

3,681,620

VARIABLE FREQUENCY CONTROL CIRCUIT

BACKGROUND OF THE INVENTION

The present invention relates generally to control circuitry operable to control an integrating load powered from a D.C. supply source and more particularly to a solid state speed control circuit having substantially instantaneous recycle characteristics which is particularly adapted for D.C. motor control.

An increasing demand for portable or compact electrical units powered from batteries or similar D.C. supply sources of limited voltage has led to the development of solid state control circuits for various D.C. load devices. Such circuits are prevalent in the D.C. motor control field, for a D.C. motor is a common drive source for compact electrical units. These motors are found in windshield wipers, automobile airconditioners, blowers and heaters, battery driven vehicles, power tools and appliances, and in many similar compact or portable units.

Considering a D.C. motor as an exemplary load, it must be noted that such motors are designed to strict tolerances and are adapted to provide a set rate of speed for a specific level of input voltage. In the past, speed control units for D.C. motors have been developed which control motor speed by converting an input from a D.C. power source into a pulsed D.C. signal which is employed to drive the motor. To vary motor speed, the pulse width of the motor driving pulses is varied. These variable pulse width speed control systems suffer from a number of disadvantages. For example, the inertia of the motor armature must be overcome if the motor is to operate, and with pulse width control systems, motor armature inertia may not be effectively overcome during shorter pulse time control periods. This results in erratic motor operation.

In an attempt to alleviate the problems resulting from variable pulse width control systems, variable frequency motor control systems have been developed wherein the frequency of the motor drive pulses is varied to alter motor speed. Often, as illustrated by U.S. Pat. No. 3,446,992 to James E. Webb, such variable frequency control systems also incorporate variable pulse width control. As will be noted from the Webb patent, variable frequency motor control may be achieved by employing an oscillator type pulse generator with a multivibrator to vary the frequency of motor drive pulses derived from a D.C. power source. However, the pulse generators and multivibrators of these speed control circuits employ capacitors which must be charged and discharged to provide each cycle of the motor drive signal. The recycle time of these devices is extremely slow, and severely limits the maximum speed attainable with a D.C. motor employing a variable frequency speed control unit. Often, the speed control unit will reduce by as much as 50 percent the maximum speed of a D.C. motor at a rated voltage input. Thus a D.C. motor rated by the manufacturer to provide 200 rpm at 14 volts D.C. may only provide 100 rpm at 14 volts D.C. when a conventional variable frequency speed control unit is interposed between the D.C. source and the motor.

It is a primary object of the present invention to provide a novel and improved variable frequency control unit operable from a D.C. source to provide variable frequency drive pulses of constant pulse width to a D.C. load.

Another object of the present invention is to provide a novel and improved solid state variable frequency control unit operable from a D.C. source to provide variable frequency drive pulses of constant pulse width to a load which is adapted to recycle substantially instantaneously.

A still further object of the present invention is to provide a novel and improved solid state variable frequency control unit particularly adapted for D.C. motor speed control. This unit provides pulses of constant pulse width to a controlled D.C. motor through the action of a monostable multivibrator which is driven by a pulse generator. Both the multivibrator and pulse generator are provided with capacitor discharge circuits which permit substantially instantaneous recycling of the control unit.

These and other objects of the present invention will become apparent upon a consideration of the following specifications taken in conjunction with the accompanying drawing which illustrates a circuit diagram of the variable frequency control circuit of the present invention.

Referring now to the drawing, the control circuit of the present invention indicated generally at 10 includes a variable frequency pulse generator 12 and a monostable multivibrator 14 connected to an integrating D.C. load; in this case a D.C. motor 16. The variable frequency pulse generator includes a voltage divider formed by resistors 18 and 20 connected in series across D.C. input terminals which may be connected to any suitable D.C. voltage source. A positive line 22 connected to the positive terminal of the D.C. source provides power to the control circuit 10, and a return line 24 is connected to the negative terminal of the D.C. source.

A second series circuit including a potentiometer 26, a resistor 28 and a capacitor 30 is also connected across the input terminals in parallel relationship to the voltage divider. The variable frequency pulse generator is completed by a transistor 32 having a collector electrode 34, an emitter electrode 36 connected between the resistors 18 and 20, and a base electrode 38 connected between the resistor 28 and capacitor 30.

The monostable multivibrator 14 includes a transistor 40 having an emitter electrode 42 connected to the line 22, a base electrode 44 connected to the collector 34 of the transistor 32 and to the line 22 through a base resistor 46, and a collector electrode 48 connected in series with resistors 50 and 52 to the terminal 24. A second transistor 54 includes a base electrode 56 connected between the resistors 50 and 52, an emitter electrode 58 connected to the line 24 and a collector electrode 60 connected to the base electrode 62 of a third transistor 64. The third transistor also includes a collector electrode 66 connected to the emitter electrode 58 of the transistor 54 and an emitter electrode 68 connected by means of a resistor 70 to the collector electrode 60. The motor 16 is connected between the emitter electrode 68 and the input line 22.

The "on" time of the monostable multivibrator 14 is determined by a series RC circuit including a capacitor 72 connected to a point between the motor 16 and the emitter electrode 68 and a resistor 74 connected to the base 44 of the transistor 40 and the collector 34 of the transistor 38. A diode 76 having an anode connected between the capacitor 72 and the resistor 74 and a cathode connected to the input line 22 provides a discharge path for the capacitor 72.

The capacitor 30 is discharged during the operation of the monostable multivibrator 14 by a diode 78 having an anode connected between the resistor 28 and the capacitor 30 and a cathode connected between the motor 16 and the emitter 68.

When the D.C. motor 16 forms the load for the control circuit 10, a "free wheeling" diode 80 is connected across the motor to provide a discharge path for reactive energy stored in the motor when the monostable multivibrator 14 is active.

In the operation of the control circuit 10, the monostable multivibrator 14, which includes complementary transistor sections, is normally off. When the control circuit is connected to the D.C. power supply, such as, for example, by the operation of a switch 51, the capacitor 30 begins to charge through potentiometer 26 and resistor 28. Preferably, the potentiometer 26 is a right hand logarithmic potentiometer which operates to vary the charging time of the capacitor 30 and thus the frequency of the output pulses from the pulse generator 12 and the speed of the motor 16. The motor speed will be a linear function of the angular rotation of the potentiometer 26 when a logarithmic potentiometer is employed.

The resistor 28 limits the maximum charging speed for the capacitor 30 and therefore limits the number of pulses generated by the pulse generator 12 in any time period. Also, the resistors 18 and 20 hold the emitter electrode 36 of the transistor 32 at a set D.C. level, and the capacitor 30 must charge above this emitter voltage level before the transistor 32 can conduct.

When the capacitor 30 raises the base voltage of the transistor 32 above the emitter voltage level set by the resistors 18 and 20, the transistor conducts causing the current to the collector 34 thereof through the resistor 46 to form the base current for the transistor 42 of the monostable multivibrator 14. This transistor now begins to conduct, and current from the collector 48 thereof flows through the resistors 50 and 52 to drive the transistors 54 and 64 into conduction. This results in the application of power to the motor 16.

The conduction of the transistors 54 and 64 causes the plate of the capacitor 72 connected thereto to be pulled down, and the capacitor begins to charge through the resistor 74, thus driving the transistor 40 to saturation. Also, conduction of the transistors 54 and 64 causes the diode 78 to conduct to discharge the capacitor 30. Thus this capacitor is put in condition for a new cycle of operation during the operation of the monostable multivibrator 14.

The capacitor 72 will continue to charge until a charge level is reached where the current through the resistor 74 begins to decrease and transistor 40 comes out of saturation. Current through the resistor 74 will continue to decrease as the capacitor 72 attains a maximum charge capacity, and current through the transistor 40 to the base of the transistor 54 will decrease. This results in a decreased conduction of the transistors 54 and 64, and the plate of the capacitor 72 connected thereto will now be driven positive. This reverses the current to the transistor 40 by way of the resistor 74, and the transistors 40, 54 and 64 are driven off. Also the charge on the capacitor 72 is driven down through the diode 76, through the motor 16 and back to the negative side of the capacitor. This actual driving of the charge from the capacitor 72 through the diode 76 is extremely important, for the discharge of the capacitor is substantially instantaneous. The capacitor 30 has previously been discharged, so the recycle time of the control circuit 10 is limited only by the discharge time for the capacitor 72. As this discharge is practically instantaneous, the control circuit recycle time is also substantially instantaneous. In practice, it has been found that the control circuit 10 delivers up to 98 percent of the rated motor speed of a D.C. motor.

The "on" time of the monostable multivibrator 14 and thus the pulse width of the driving pulses to the motor 16 is determined by the resistor 74 and the capacitor 72, and is maintained at a constant value. In the case of an electric motor control, this resistor and capacitor are matched to the particular electric motor employed so that the drive pulse width is always sufficient to overcome the inertia of the motor armature. Also, the diode 76 operates to stabilize the pulse width set by the resistor 74 and the capacitor 72, for the diode starts to discharge the capacitor down to a specific reference level the moment the multivibrator 14 begins to shut off. This stable reference level is maintained by the diode 76 so that each drive pulse begins at the same point on the charge curve for the capacitor 72.

The control circuit 10 is particularly well adapted for D.C. motor speed control but it will be readily apparent to one skilled in the art that the extremely rapid recycle capability of this circuit facilitates adaptation of the circuit as a control for a variety of integrating D.C. loads.

I claim:

1. A control circuit for providing drive pulses of variable frequency and constant pulsewidth from a D.C. power source to a load comprising variable frequency pulse generator means operative to provide output pulses of a selected frequency and drive pulse switching means connected to receive said output pulses and operative in response thereto to pass drive pulses of constant pulse width through said load from said D.C. power source, said pulse switching means operating to vary the frequency of said drive pulses in response to variations in the frequency of said output pulses.

2. The control circuit of claim 1 wherein said variable frequency pulse generator means includes a capacitor, a variable charging circuit connected between said D.C. source and said capacitor for charging said capacitor at a preselected rate, and semiconductor means connected to fire and provide an output pulse when said capacitor reaches a determined charging point, and capacitor discharge means connected to said capacitor and to said drive pulse switching means, said capacitor discharge means being operative by said drive pulse switching means upon receipt thereby of an output pulse to discharge said capacitor.

3. The control circuit of claim 1 wherein said drive pulse switching means includes a monostable multivibrator having first transistor means connected to receive said output pulses, said first transistor means being rendered conductive upon receipt thereby of an output pulse, second transistor means connected to be rendered conductive upon conduction of said first transistor means, and multivibrator capacitor means connected between said first and second transistor means and operative upon conduction of said second transistor means to charge to increase the conduction of transistor means, said multivibrator capacitor means operating upon reaching a determined charge to decrease the conduction of said first transistor means until termination of conduction thereby.

4. The control circuit of claim 3 wherein a multivibrator capacitor discharge means is connected to said multivibrator capacitor means, said second transistor means being operated by the decrease in conduction of said first capacitor means to decrease conduction of said second transistor means until termination of conduction thereof, said second transistor means operating subsequent to the initiation of decreased conduction therethrough to cause said multivibrator capacitor to discharge through said multivibrator capacitor discharge means.

5. The control circuit of claim 4 wherein said multivibrator capacitor discharge means includes diode means operative to discharge said multivibrator capacitor means to a set discharge level.

6. The control circuit of claim 4 wherein said second transistor means operates to reverse bias said multivibrator capacitor means to rapidly discharge said multivibrator capacitor means through said multivibrator capacitor discharge means.

7. The control circuit of claim 6 wherein said variable frequency pulse generator means includes a capacitor, a variable charging circuit connected between said D.C. source and said capacitor for charging said capacitor at a preselected rate, and semiconductor means connected to fire and provide an output pulse when said capacitor reaches a determined charging point, and capacitor discharge means connected to said capacitor and to said drive pulse switching means, said capacitor discharge means being operative by said drive pulse switching means upon receipt thereby of an output pulse to discharge said capacitor.

8. The control circuit of claim 7 wherein said variable charging circuit includes a logarithmic potentiometer 9. The control circuit of claim 7 wherein said capacitor discharge means includes a diode having an anode connected to said capacitor and a cathode connected to said second transistor means, said diode being biased into conduction upon the conduction of said second transistor means.

* * * * *

UNITED STATES PATENT OFFICE
CERTIFICATE OF CORRECTION

Patent No. 3,681,620          Dated August 1, 1972

Inventor(s) HENRI H. HOGE

It is certified that error appears in the above-identified patent and that said Letters Patent are hereby corrected as shown below:

Column 5, line 4, after "of" and before "transistor", insert --said first--.

Signed and sealed this 9th day of January 1973.

(SEAL)
Attest:

EDWARD M. FLETCHER, JR.          ROBERT GOTTSCHALK
Attesting Officer                Commissioner of Patents